(12) United States Patent
Dudley et al.

(10) Patent No.: US 8,626,558 B2
(45) Date of Patent: Jan. 7, 2014

(54) SUPPLY CHAIN RISK MANAGEMENT METHOD AND DEVICE

(75) Inventors: Jodi Ann Dudley, Midland, MI (US); Michel Hertay, Nivelles (BE)

(73) Assignee: Dow Corning Corporation, Midland, MI (US)

( * ) Notice: Subject to any disclaimer, the term of this patent is extended or adjusted under 35 U.S.C. 154(b) by 79 days.

(21) Appl. No.: 13/226,762

(22) Filed: Sep. 7, 2011

(65) Prior Publication Data

US 2013/0060598 A1 Mar. 7, 2013

(51) Int. Cl.
*G06Q 10/00* (2012.01)

(52) U.S. Cl.
USPC ...................................................... 705/7.28

(58) Field of Classification Search
USPC ...................................................... 705/7.28
See application file for complete search history.

(56) References Cited

U.S. PATENT DOCUMENTS

| | | | |
|---|---|---|---|
| 6,671,673 B1 * | 12/2003 | Baseman et al. | 705/7.26 |
| 7,246,080 B2 * | 7/2007 | Feldman et al. | 705/7.28 |
| 7,747,572 B2 * | 6/2010 | Scott et al. | 707/636 |
| 7,870,012 B2 * | 1/2011 | Katz et al. | 705/7.26 |
| 2002/0169658 A1 * | 11/2002 | Adler | 705/10 |
| 2003/0014287 A1 * | 1/2003 | Williams et al. | 705/7 |
| 2003/0033179 A1 * | 2/2003 | Katz et al. | 705/7 |
| 2003/0074206 A1 * | 4/2003 | Hoffman et al. | 705/1 |
| 2004/0260703 A1 * | 12/2004 | Elkins et al. | 707/100 |
| 2006/0184371 A1 | 8/2006 | Tsalakopoulos | |
| 2008/0140514 A1 | 6/2008 | Stenger | |
| 2008/0172262 A1 * | 7/2008 | An et al. | 705/7 |
| 2010/0198630 A1 * | 8/2010 | Page et al. | 705/7 |
| 2010/0198631 A1 * | 8/2010 | Edwards et al. | 705/7 |
| 2010/0198661 A1 * | 8/2010 | McMurray et al. | 705/11 |

OTHER PUBLICATIONS

Brooke McIntyre and John Hollenbach. "Risk Mitigation Assessment for Raw Materials," 2009, down loaded on Sep. 17, 2012 from http://www.doeingalls.com/sites/default/files/files/Risk%20Mitigation%20Assessmen%20For%20Your%20Raw-%20Materials.pdf.*

Timothy J. Pettit. Supply Chain Resilience: Development of a Conceptual Framework, an Assessment Tool and an Implementation Process. Ph.D Dissertation, The Ohio State University, 2008. Accessed Sep. 18, 2012, from http://www.dtic.mil/cgi-bin/GetTRDoc?Location=U2&doc=GetTRDoc.pdf&AD=ADA488407 (Appendixes have been removed.*

Timothy J. Pettit, Joseph Fiksel, Keely L. Croxton. "Ensuring Supply Chain Resilience: Development of a Conceptual Framework." Journal of Business Logistics [serial online]. Mar. 2010;31(1):1-21. Available from: Business Source Complete, Ipswich, MA. Accessed Sep. 18, 2012.*

Wayne S. Evans and Sven Blawatt. "The Growth Potential in Managing Supplier Risk", Sep. 1, 2010, Supply Chain Management Review.*

PR Newswire."Six Teams From Leading Companies to Compete for CSCMP's 2011 Supply Chain Innovation Award™ at Annual Conference" Aug. 15, 2011, downloaded Sep. 18, 2012 from http://www.prnewswire.com/news-releases/.*

Brooke McIntyre and John Hollenbach. "Risk Mitigation Assessment for Raw Materials," 2009, down loaded on Sep. 17, 2012 from http://www.doeingalls.com/sites/default/files/files/Risk%20Mitigation%20Assessmen%20For%20Your%20Raw-%20Materials.pdf.*

Business Continuity Planning & Procurement—Managing our Risk MAPI Presentation—Oct. 2010, by Heidi Landry-Chan, Dow Corning Corporation.

Minimizing Risk in your raw material supply chain, by John Hollenbach, Doe & Ingalls of North Carolina, Dec. 6, 2007.

A Primer on Sourcing and Procurement in an Integrated Supply Chain, by Wendy L. Tate, Supply Chain Management Review, Oct. 21, 2010.

* cited by examiner

*Primary Examiner* — Peter Choi
*Assistant Examiner* — George H Walker
(74) *Attorney, Agent, or Firm* — Claude F. Purchase

(57) ABSTRACT

The invention comprises a device for and method of managing supply chain risk at a computer system device comprising a processor, a memory subsystem in communication with the processor, and computer executable instructions storable in the memory subsystem and executable by the processor to perform the method, the method comprising determining a degree of supply chain risk to an enterprise as a function of an effect of a disruption of delivery of the production input to the enterprise on a financial performance metric of the enterprise.

5 Claims, No Drawings

SUPPLY CHAIN RISK MANAGEMENT METHOD AND DEVICE

CROSS-REFERENCE TO RELATED APPLICATION

Not applicable.

STATEMENT REGARDING FEDERALLY SPONSORED RESEARCH

Not applicable.

This invention relates to, inter alia, a method and device for managing enterprise risk.

BACKGROUND OF THE INVENTION

Risks to an enterprise include the possibility of loss or reduction of revenues, margins, earnings, and other financial metrics; increase in financial or operational leverage; loss of key personnel and unsatisfactory executive performance; obsolescence of products and services; reduction of product and service quality; breaches of ethical, legal and regulatory compliance; loss of reputation; loss or disqualification of a supplier; and unsatisfactory operational safety. Enterprises employ strategic and tactical methods to manage their exposure to these and other enterprise risks. Examples of these risk management methods are employee retention and training programs; financial controls; reducing or refinancing debt; reducing fixed production costs; oversight by a board of directors; marketing programs; product and service quality controls; compliance and safety audits; and qualifying additional suppliers of materials, goods and services. Enterprises that rely on suppliers for materials, goods or services and are at risk of a disruption of supply thereof may manage this supply chain risk using a supply chain management method.

BRIEF SUMMARY OF THE INVENTION

This invention provides a method and device for managing enterprise risk, more particularly enterprise risk comprising supply chain risk.

First, the invention provides a method of managing supply chain risk at a computer system device comprising a processor, a memory subsystem in communication with the processor, and computer executable instructions storable in the memory subsystem and executable by the processor to perform the method, the method comprising determining a degree of supply chain risk to an enterprise as a function of an effect of a disruption of delivery of a production input to the enterprise on a financial performance metric of the enterprise.

Second, the invention provides the computer system device.

The supply chain risk score, method and device are useful for managing enterprise risk comprising supply chain risk of the enterprise.

DETAILED DESCRIPTION OF THE INVENTION

The Brief Summary and Abstract are incorporated here by reference. The method comprises determining the degree of enterprise risk comprising supply chain risk to the enterprise. The degree of supply chain risk is correlated to the effect on the financial performance metric. The effect comprises a result of the disruption of the delivery of the production input to the enterprise. The disruption is a potential future event that may or may not ever occur. The greater the effect of the disruption on the financial performance metric (i.e., the greater a resultant or would-be negative change in the metric), the greater the degree of supply chain risk to the enterprise related to the production input. Also all other things being equal, the greater the probability of the disruption occurring, the greater the degree of supply chain risk. The method may be used, for example, to ascertain different levels of impact on the financial performance metric and supply chain risk of a disruption of one production input versus another, where the different levels may be due to different degrees of the effect, different probabilities of the disruption, or a combination thereof. The method may be used, e.g., compare supply chain risks related to different production inputs or different suppliers of a same production input.

"Disruption" and variations thereof (e.g., disrupt) means delay or interruption of continuity or regularity (e.g., of delivery) or variations thereof. "Enterprise" means a for-profit or not-for-profit, revenue-generating or non-revenue-generating organization, or a division or subsidiary thereof. The enterprise may receive, take in or operate on the production input in a manufacturing or service process of the enterprise. "Enterprise risk" means possibility of loss to the enterprise. "Financial performance metric" means a measure of economic activity of the enterprise. The measure may be currency denominated or derived therefrom. "Production input" means a material, component, or action put in, taken in or operated on by a manufacturing or service process. The manufacturing process may prepare a composition of matter or article; the service process may provide a service. "Supply chain risk" is a type of enterprise risk that means possibility of loss that is a function of a disruption of delivery of a production input to an enterprise.

"A," "an," and "the" each refer to one or more, unless otherwise indicated by the context of specification. "May" is used in the sense of conferring a choice, and is not used in an imperative sense. "Optionally" means in some embodiments that which is optional is absent, and in other embodiments that which is optional is present. A range includes the range itself, its endpoints, and any number subsumed therein. A Markush group includes the entire group and also any individual members and subgroups subsumed therein.

The financial performance metric used in the invention method is one that reflects the degree of economic activity of the enterprise. Any financial performance metric or combination of metrics suitable for managing supply chain risk according to the method may be used. For example, the financial performance metric may be a line item in a GAAP or non-GAAP income statement of the enterprise. Examples of suitable positive type financial performance metrics are revenues (e.g., sales), gross margins, operating margins, net profit margins, operating earnings, earnings before interest, taxes and depreciation and amortization (EBITDA), earnings before interest and taxes (EBIT), net earnings, and any combination of at least two thereof. Examples of suitable negative type financial performance metrics are cost of goods sold, cost of services provided, and inventory expense.

A decrease in the degree of economic activity of the enterprise has at least one undesirable direct consequence such as loss or decrease of revenues; loss or decrease of funding (e.g., not for profit organizations); decrease of margins or earnings; decrease of other desirable financial metrics; increase in financial or operational leverage; or any combination of at least two thereof. The decrease in the degree of economic activity of the enterprise also may have at least one undesirable follow-on consequences such as employee layoffs, executive departures, or both; obsolescence of products and services; reduction of product and service quality (e.g., inconsistent or unsatisfactory quality); breaches of ethical, legal and regulatory compliance; loss of enterprise reputation; safety violations; a disruption of a service to the enterprise (service examples are described later); or any combination of at least two thereof. Thus, the invention method and device benefits enterprises desiring to manage their risk of a decrease of economic activity because the invention enables managers, investors, and other constituents of the enterprise to effectively assess enterprise risk comprising supply chain risk, and then if desired take corrective or other ameliorating action based on the assessment.

Until the present invention was made, there was no recognition in the art of the value of and advantages to managing supply chain risk based on the possibility of ultimate economic loss to which it exposes the enterprise. Rather, prior art approaches viewed supply chain risk only in terms of the supply chain itself, e.g., in terms of costs of production inputs, quality of production inputs, numbers of suppliers of a same production input, supply chain logistical efficiency, and the like. The present inventors are the first to provide a method and device for, and recognize the advantages of, measuring supply chain risk to an enterprise as a function of an effect of a disruption of delivery of the production input to the enterprise on a financial performance metric of the enterprise. Thus, the method may, for example, enable managers, investors or other constituents of enterprises (e.g., community members) to more effectively identify supply chain risks, compare different supply chain risks, prioritize their efforts to mitigate or avoid the different supply chain risks, intelligently reduce or understand overall supply chain risk, or any combination of at least two thereof. The managers and other constituents of the enterprise may then intelligently take the corrective or other ameliorating action, if desired, based on supply chain risks determined by the method. These ameliorating actions may comprise reducing supply chain risk by prioritizing and strategically implementing a program for reducing or mitigating supply disruption risks. The reducing or mitigating may include diversifying sources (suppliers) of the production input, qualifying an additional supplier thereof, or replacing a current supplier with a more reliable supplier of the production input. The foregoing mitigating may also reduce cost of purchasing the production input. The reducing or mitigating may alternatively include derisking a current supplier of the production input by providing it with financial or another form of assistance or by purchasing a higher volume of the production input therefrom, or providing assurance of the higher volume, or improving or securing logistics of the delivery of the production input, all based on the determining result(s) of the method. The method, for example, is valuable where it identifies a particularly high risk production input, or ranks and prioritizes of two or more production inputs, for corrective or other ameliorating action.

The method advantageously makes the degree of supply chain risk proportional to the extent of the effect of the disruption of the delivery of the production input to the enterprise on the financial performance metric and economic activity of the enterprise. As a result of the disruption of the delivery of the production input to the enterprise, the effect is that the financial performance metric for the enterprise changes in a negative way and the degree of enterprise risk correspondingly increases in magnitude. For example, if the delivery of the production input is disrupted, the effect may be observed as a decrease of a positive type financial performance metric or increase of a negative type financial performance metric. The decrease of the positive type of financial performance metric may be qualitative, alternatively a decrease in quantity. The increase of the negative type of the financial performance metric may be qualitative, alternatively an increase in quantity.

The determining step of the method may be carried out in any manner suitable for accomplishing the method. For example, the determining step may comprise factoring an economic impact score (EI) with a supply risk score (SR) to give a supply chain risk score (SCR) that is reflective of the degree of supply chain risk. The "supply chain risk score" reflects the effect of the disruption of the delivery of the production input to the enterprise on the financial performance metric, and thus the economic activity, of the enterprise. The greater the effect of the disruption, the greater the supply chain risk. The factoring may comprise a mathematical equation having the supply chain risk score on one side and a mathematical relationship between the economic impact and supply risk scores on the other side. Examples of suitable mathematical equations are: $SCR=EI+SR$; alternatively $SCR=(EI+SR)/2$; alternatively $SCR=EI*SR$, alternatively $SCR=EI*SR/10$. The * indicates multiplication and / indicates division. The values for EI and SR, and thus SCR, may be of any scale suitable for carrying out the determining step of the method and calculation of EI and SR may include numerical corrections to adjust their values to a convenient scale, e.g., a scale of from 0 to 10 or from 1 to 10. Convenient scales for the values of EI and SR independently are normalized values. The normalized values for EI and SR may allow comparing, ranking, or comparing and ranking supply chain risks of at least two different production inputs, at least two different suppliers (e.g., of a same input), or a combination thereof. The different production inputs may be to a same enterprise, alternatively to different enterprises, alternatively a combination thereof. Any normalized values suitable for carrying out the method may be used. For example, each of EI and SR may be independently normalized to a scale of from >0 to 10, alternatively from 1 to 10, wherein the higher the score the greater the risk.

The "supply risk score" (SR) is a numerical value comprising an overall likelihood that the disruption of the delivery of the production input to the enterprise could occur (e.g., SR may be normalized to a relative scale of 1 to 10 with 1 being least likelihood of the disruption occurring and 10 being greatest likelihood of the disruption occurring). The supply risk score may be determined by evaluating at least one delivery disruption risk factor. Such factors may comprise, for example, at least one of external market factors, internal market factors, supplier factors, or any combination of at least two thereof. Examples of suitable external market factors are number P of potential suppliers of the production input (e.g., P normalized to a relative scale of 1 to 10 with 1 being many suppliers and 10 being one supplier, e.g., as in a monopolistic market), alternatively potential suppliers score P, where P=1 if 10 or more potential suppliers, P=3 if 5 to 10 potential suppliers, P=5 if 3 or 4 potential suppliers, and P=7 if 1 or 2 potential suppliers; supplier market structure complexity, which may include product differentiation (e.g., market complexity score normalized to a relative scale of 1 to 10 with 1 being least complex and 10 being most complex); production input demand/price volatility (e.g., demand/price volatility score, normalized to a relative scale of 1 to 10 with 1 being no volatility and 10 being most volatile); threat of regulatory (governmental) restriction (e.g., threat-supply regulation score normalized to a relative scale of 1 to 10 with 1 being no threat and 10 being most threatening); or any combination of at least two thereof. Examples of regulatory restriction are import/export controls and legislation controlling availability, handling (e.g., transportation), and registration of materials (e.g., REACH regulations in Europe). Examples of suitable internal market factors are number Q of qualified suppliers of the production input (e.g., Q normalized to a relative scale of 1 to 10 with 1 being many qualified suppliers and 10 being zero or one qualified supplier; alternatively, Q=1.5 if one qualified supplier, Q=0.5 if two qualified suppliers, and Q=0 if three or more qualified suppliers); complexity of the supplier qualification process (e.g., qualification complexity score normalized to a relative scale of 1 to 10 with 1 being easy to qualify and 10 being most difficult to qualify); complexity of logistics of the supply chain of the production input (e.g., logistics complexity score normalized to a relative scale of 1 to 10 with 1 being least complex and 10 being most complex); difficulty of producing the production input with sufficient quality (e.g., quality complexity score normalized to a relative scale of 1 to 10 with 1 being not difficult and 10 being greatest difficulty); or any combination of at least two thereof. Examples of suitable supplier factors are value of the supplier's overall sales to the enterprise (or sales of the production input to the enterprise as a proportion of the supplier's total sales) (e.g., value-enterprise score normalized to a relative scale of 1 to 10 with 1 being the enterprise buying the production input is strategic to the supplier (e.g., the enterprise generates a high proportion or value of supplier's total sales) and 10 being the enterprise buying the production input is not non-strategic to the supplier, i.e., the enterprise is a relatively small transactional customer of the supplier (e.g., the enterprise generates a lowest proportion or value of supplier's total sales)); value of the supplier's overall sales to all enterprises receiving the production input, e.g., as a proportion of the suppliers total sales, e.g., value-production input score normalized to a relative scale of 1 to 10 with 1 being strategic sales (e.g., highest proportion or value of supplier's total sales) and 10 being non-strategic sales (e.g., lowest proportion or value of supplier's total sales)); historical supply performance of the supplier (e.g., historical performance score normalized to a relative scale of 1 to 10 with 1 being best historical performance, e.g., most reliable, fewest disruptions, and 10 being worst historical performance); threats to the supplier (e.g., threats to supplier score normalized to a relative scale of 1 to 10 with 1 being lowest threat and 10 being greatest threat), where such threats may be, e.g., financial stance (e.g., debt) of supplier; untapped production capacity of supplier, or geopolitical risk of supplier; or any combination of at least two thereof. SR may be a sum or multiplication product of two or more of the foregoing delivery disruption risk factors. If desired, different delivery disruption risk factors may be weighted differently than other such factors or weighted differently for one production input or supplier than for another. The strategic production input is one where the supplier will not deinvest or stop making same. The non-strategic production input is one where the supplier may stop making the production input if the input is not profitable enough for the supplier. The supplier may also be characterized by the sustainability or non-sustainability of raw materials used to make the production input (e.g., production inputs made from biomass or petroleum-based hydrocarbon).

The "economic impact score" (EI) reflects a degree of sensitivity of the financial performance metric, and hence the economic activity of the enterprise, to the supply disruption. Any suitable economic impact score may be used. The economic impact score may be qualitative, alternatively quantitative. The economic impact score may be proportional to the decrease of the positive type financial metric (e.g., sales or profits), the increase of the negative type financial metric (e.g., inventory expense) of the enterprise, or any combination of at least two thereof, if the supply of the production input to the enterprise would be disrupted. Thus, the economic impact score may be the positive type financial metric, negative type financial metric, a normalized value thereof, or any combination of at least two thereof. For example, the economic impact score may comprise, alternatively may be normalized annual revenues of the product(s) produced by the enterprise using the production input, wherein the normalized revenues are expressed on a common logarithmic ($\log_{10}$) scale of from >0 to 10, wherein the economic impact score is >0 where the annual revenues of the enterprise related to the production input are >0% of total revenues of the enterprise and the economic impact score is 10 where the annual revenues of the enterprise related to the production input have the greatest value to the enterprise or are the largest proportion of total revenues, up to 100% of total revenues of the enterprise. Alternatively, EI comprises normalized annual gross margin in currency (GMc) of the product(s) produced by the enterprise using the production input, wherein the normalized GMc is expressed on a $\log_{10}$ scale of from >0 to 10, wherein the economic impact score is >0 where the annual GMc of the enterprise related to the production input is >0% of total GMc of the enterprise and the economic impact score is 10 where the annual GMc of the enterprise related to the production input is 100% of total GMc of the enterprise; and wherein SR is at least one of an external market factor, internal market factor, supplier factor, or any combination of at least two thereof and SR is normalized to a relative scale of 1 to 10 with 1 being least likelihood of the disruption occurring and 10 being greatest likelihood of the disruption occurring. The GMc may be cost of the product(s) sold in one year by the enterprise, expressed in any currency, $C^R$, e.g., U.S. dollars (\$), Chinese renminbi yuan (¥), European Euros (€), or Japanese yen (¥).

For example for a given production input that feeds into one or more products of the enterprise, SCR may be calculated from the following EI and SR. EI=$\log_{10}$[(product(s) gross margin $C^R$)/(enterprise gross margin $C^R$)*(product(s) gross margin %, scale 0-1)*30,000*10]/$\log_{10}$[(enterprise gross margin %)*30000]; wherein product(s) gross margin $C^R$=(product(s) sales $C^R$)*(product(s) gross margin %, scale 0-1), where product(s) sales $C^R$ is total currency sales from all product(s) manufactured from the production input and sold by the enterprise and product(s) gross margin % is the average gross margin percentage of all such manufactured and sold product(s); wherein "enterprise" and "average" are based on values for the whole enterprise (or, if desired, the division or subsidiary thereof); and wherein $C^R$ indicates a currency denominated value. The 10 and 30,000 are numerical corrections. For the same production input, SR may be the highest score from SR(a) or SR(b), wherein SR(a) is Threat-Supply Regulation Score; and SR(b) is the sum of all of the following factors (i) to (ix): (i) number of qualified suppliers score Q, where Q=1.5 if one qualified supplier, Q=0.5 if two qualified suppliers, and Q=0 if three or more qualified suppliers+(ii) (qualification complexity score)*0.1+(iii) (logistics complexity score)*0.1+(iv) (quality complexity score)*0.1+(v) (value of production input score)*0.2+(vi) (value-enterprise score)*0.1+(vii) (historical performance score)*0.4+(viii) (threats to supplier score)*0.6+(ix) −4 (i.e., SR(b)=sum of (i) to (viii) −4). Factors (ii) to (viii) are weighted. In another example where at least two production inputs are obtained from a single supplier and feed into one or more products, in the formula for EI, product(s) sales $C^R$ would be total dollar sales from all products manufactured from the at least two production inputs and product gross margin % is the average gross margin percentage of all products manufactured from the at least two production inputs and EI reflects economic impact risk of the supplier on the enterprise. The EI formula optionally may be weighted to give greater impact per unit gross margin on SCR for higher net profit margin products than for lower net profit margin products. The specific numerical values for EI, SR, and SCR may not be important provided their relative values for different production inputs or suppliers qualitatively reflect relative supply chain risks associated with those production inputs or suppliers.

Alternatively, the economic impact score may be the negative type financial performance metric that is total annual spending by the enterprise to purchase the production input from the supplier. For example, the economic impact score may be total annual spending by the enterprise on the production input or a normalized value thereof. For example, the normalized value of annual spending on the production input (normalized production input annual spend) may be expressed as a normalized value on a scale of from >0 to 10, wherein the economic impact score is >0 where >0% of total annual production input spend by the enterprise is on the production input and the economic impact score is 10 where 100% of total annual production input spend by the enterprise is on the production input; alternatively any combination of at least two thereof. Alternatively, the economic impact score may be a combination of at least one positive type financial performance metric and at least one negative type financial performance metric. For example, the economic impact score may be a combination of the aforementioned economic impact scores derived from the normalized production input-derived annual revenues received by the enterprise and normalized production input annual spending by the enterprise.

An advantage of the method is that the supply risk score, economic impact score, and overall supply chain risk score are more than adequate even if used in a relative sense (i.e., the absolute score values are not nearly as relevant as their relative differences) such that the factors determining the relevant scores can be flexibly adjusted from user-to-user of the method so as to improve or optimize sensitivity and correlation capability of the method under the particular circumstances.

The production input may comprise the material, alternatively the component, alternatively the service action. The material may comprise a raw material, alternatively a partially finished material, alternatively a by-standing component of a process (e.g., a solvent). The raw or partially finished material may be used as an ingredient or reactant in manufacturing a composition of matter or manufacturing an article comprising the ingredient or a product of a reaction of the reactant. For example, the production input may be a raw material, alternatively a partially finished material for a chemical process performed by the enterprise. The chemical process may be integrated so as to ultimately produce at least two different products from the raw material.

The raw material may comprise a starting reactant in a single step process, alternatively a multistep process. The raw material may be obtained from a supplier thereof. The supplier may be an internal supplier (e.g., as in an enterprise comprising an integrated chemicals manufacturer employing the integrated chemical process), alternatively an external supplier, i.e., an organization that is a separate legal entity from the enterprise. The process may be a chemical process (e.g., making a formulation, e.g., an emulsion), alternatively other process (e.g., making a multicomponent article, e.g., automobile or solar panel assembly).

Alternatively, the production input may comprise the partially finished material, which can be produced in a step of one process and used as a raw material in another process. Manufacturing (e.g., chemical) operations may comprise at least two integrated processes, wherein the integrated processes have at least one step (e.g., reaction step) in common (e.g., divergent syntheses). For example, one of the integrated processes may produce the partially finished material as an intermediate material therein or end product material thereof (which end product material may then be sold to another organization for further processing). The partially finished material may also be used as an intermediate material in another one of the integrated processes. The partially finished material may comprise, for example, a treated material (e.g., heat treated, polished, or pulverized material); alternatively a transformed material (e.g., reaction product). The partially finished material may comprise a main product, alternatively a by-product of one of the integrated processes. The by-product may be produced in a step of a first multistep process. The by-product may be used as an end product of a second process, alternatively as an intermediate or starting material in a second multistep process, wherein the first and second (multistep) processes produce different end products and have at least one reaction step in common (i.e., are integrated processes).

Alternatively, the product input may comprise the service to the enterprise. Examples of the service are a financial (e.g., accounting), information technology (e.g., software-as-a-service-based or hardware design service), consulting service, legal service (e.g., intellectual asset management or patent service), engineering service (e.g., product or plant design or testing service), manufacturing service (e.g., toll manufacturing), procurement service (e.g., purchasing), or shipping/receiving service (e.g., distributors) to the enterprise.

The method advantageously provides a means for assessing and rationally addressing a supply chain risk based on its negative effect on the financial performance metric of the enterprise. Another advantage of the method is that it may be a powerful tool to assess supply chain risk of a single production input (e.g., raw material) that is involved directly or indirectly (downstream) in at least two manufacturing processes, including integrated manufacturing processes. The disruption of the delivery of such a production input to the enterprise would impact production of multiple end products by the enterprise, and thus have an outsized negative effect on the financial performance metric of the enterprise since the financial performance metric in such circumstances would comprise a sum of an individual such metric for each one of the multiple products.

The computer system device may be any one that is useful for performing the method and many suitable computer system devices are known in the art. The computer system device may be a desktop personal computer, server, mainframe computer, or portable computer. The portable computer may be a portable multifunction device, a notebook, netbook, tablet, cellular phone, or smartphone. The processor of the computer system device may be any suitable processor (e.g., central processing unit or CPU) such as mainframe, server, or personal computer CPUs (e.g., CORE and x86 processors from Intel Corporation, Santa Clara, Calif., USA) and PowerPC processors (International Business Machines Corp., Armonk, N.Y., USA). The memory subsystem may comprise read-only access memory (ROM), random access memory (RAM), or a combination thereof. The computer system device may further comprise a storage system comprising the memory subsystem and a file storage subsystem, a communications bus, at least one user interface input device (e.g., keyboard, touch screen display, or both), at least one user interface output device (e.g., printer, electronic display (e.g., touch-sensitive display or "touch screen"), or both), or any combination of at least two thereof. The computer system device optionally may have a graphical user interface (e.g., touch-sensitive display) for translating displayed content. The computer system device optionally may further comprise one or more other components such as a memory controller, peripherals interface, input/output (I/O) subsystem, and other input or control devices.

The computer executable instructions comprise instructions for carrying out the method. The computer executable instructions may also comprise an operating system, a communication module or instruction set, a graphics module or instruction set, a text input module or instruction set, applications or instruction set, or any combination of at least two thereof. The operating system may be any suitable operating system such as Darwin, UNIX, LINUX, RTXC, OS X, WINDOWS, or VxWorks. The operating system may also include various software components, drivers, or a combination thereof for controlling and managing general system tasks (e.g., memory management, storage device control, and power management) and facilitates communication between various hardware and software components. A convenient operating system is Windows further comprising a programmable electronic spreadsheet application (e.g., EXCEL, Microsoft Corporation, Redmond, Wash., USA).

The computer system device may be non-networked or networked; stationary or portable. The non-networked computer system device may comprise the aforementioned components and instructions and is not in communication with another computer system device. The networked computer system device may comprise the aforementioned components and instructions and further comprise a network interface. The network interface is in communication with a computer network. An example of a suitable networked computer system, device is described in US 2011/0029523 A1, e.g., FIG. 2 and paragraphs [0052] to [0055]. The computer network may comprise, for example, personal computers, servers, mainframe computers, and combinations thereof. The communication between the network interface of the networked computer system device and the computer network may comprise an intranet or internal communications network of the enterprise, a local area network (LAN), the Internet (also known as the World Wide Web), or another communications network.

Certain embodiments of the invention are illustrated by the following examples, which should not be interpreted as limiting the spirit and scope of the invention

EXAMPLES 1 AND 2

Compared production inputs 1 and 2 (raw materials) for a first enterprise making and selling emulsion product(s) in the U.S. See Table 1 later.

EXAMPLES 3 AND 4

Compared production inputs 3 and 4 (raw materials) for a second enterprise making and selling electronic device product(s) in the U.S. See Table 2 later.

Comparison of two similar-spend production inputs with similar SCR scores.

| Purchasing Data | Production input 1 | Production input 2 |
|---|---|---|
| Production input Spend | $1.5 million | $1.6 million |
| Product(s) Sales $ | $500 million | $10 million |
| Product(s) Gross Margin % | 60% | 60% |

| External Market factors | Characteristic[a] | Score[b] | Characteristic | Score |
|---|---|---|---|---|
| No. Potent. Suppliers & P Score | 3 to 4 | 5 | 5-10 | 3 |
| Market Complexity & Score | Standard | 1 | Difficult | 3 |
| Demand/Price volatility & Score | Volatile | 1 | Not evaluated | NE |
| Threat-Supply Regulat. & Score | None | 0 | None | 0 |

| Internal Market factors | Characteristic | Score | Characteristic | Score |
|---|---|---|---|---|
| No. Qualified Suppliers, Q Score | 1 | 1.5 | 1 | 1.5 |
| Qualification Complex. & Score | Easy | 0 | Very Difficult | 9 |
| Logistics Complexity & Score | High | 3 | Not evaluated | NE |
| Quality Complexity & Score | Not evaluated | NE | Not evaluated | NE |

| Supplier factors | Characteristic | Score | Characteristic | Score |
|---|---|---|---|---|
| Value-Enterprise & Score | High | 1 | Low | 4 |
| Value-production input & Score | Not evaluated | NE | Not evaluated | NE |
| Historical Performance & Score | Good | 1 | Minor issues | 3 |
| Threats to supplier & Score | Not evaluated | NE | Few | 3 |
| Economic Impact Score (EI)[c] | N/a[d] | 7.4 | N/a | 3.5 |
| Supply Risk Score (SR)[c] | N/a | 4.5 | N/a | 8.0 |
| Supply Chain Risk Score (SCR)[c] | N/a | 3.4 | N/a | 2.8 |

TABLE 2

Comparison of one low-spend and one high-spend with different supply chain risk scores.

| Purchasing Data | Production input 3 | Production input 4 |
|---|---|---|
| Production input Spend | $5.0 million | $0.01 million |
| Product(s) Sales $ | $420 million | $405 million |
| Product(s) Gross Margin % | 45% | 75% |

| External Market factors | Characteristic[a] | Score[b] | Characteristic | Score |
|---|---|---|---|---|
| No. Potent. Suppliers & P Score | 5-10 | 3 | 5-10 | 3 |
| Market Complexity & Score | Standard | 1 | Difficult | 3 |
| Demand/Price volatility & Score | Not evaluated | NE | Not evaluated | NE |
| Threat-Supply Regulat. & Score | None | 0 | None | 0 |

| Internal Market factors | Characteristic | Score | Characteristic | Score |
|---|---|---|---|---|
| No. Qualified Suppliers, Q Score | 2 | 0.5 | 1 | 1.5 |
| Qualification Complex. & Score | Easy | 0 | Very Difficult | 9 |
| Logistics Complexity & Score | High | 3 | Not evaluated | NE |
| Quality Complexity & Score | Not evaluated | NE | Not evaluated | NE |

TABLE 2-continued

Comparison of one low-spend and one high-spend with different supply chain risk scores.

| Supplier factors | Characteristic | Score | Characteristic | Score |
|---|---|---|---|---|
| Value-Enterprise & Score | Average | 3 | Low | 4 |
| Value-production input & Score | Not evaluated | NE | Not evaluated | NE |
| Historical Performance & Score | Good | 1 | Minor issues | 3 |
| Threats to supplier & Score | Few | 3 | Few | 3 |
| Economic Impact Score (EI)$^c$ | N/a$^d$ | 6.9 | N/a | 7.5 |
| Supply Risk Score (SR)$^c$ | N/a | 2.0 | N/a | 8.0 |
| Supply Chain Risk Score (SCR)$^c$ | N/a | 1.4 | N/a | 6.0 |

In Tables 1 and 2, (a) characteristics were used to determine the scores; (b) scores are given on a scale of 0 to 10 unless otherwise indicated; (c) SCR=EI*SR/10, wherein EI and SR were calculated using a personal computer system running Excel with instructions for running the respective formulas shown where NE=0; (d) N/a means not applicable.

In Table 1, the supply chain risk scores for production inputs 1 and 2 indicate that production input 1 presents higher supply chain risk than input 2, and the first enterprise, especially if its resources (e.g., personnel and budget) are limited, would focus initially on reducing supply chain risk for production input 1. In Table 2, the supply chain risk scores for production inputs 3 and 4 indicate that production input 4 presents higher supply chain risk than input 3, and the second enterprise, especially if its resources (e.g., personnel and budget) are limited, would focus initially on reducing supply chain risk for production input 4. If the first and second enterprises are the same, the supply chain risk scores in Tables 1 and 2 indicate that the enterprise would initially focus on reducing supply chain risk for production input 4, and then production input 1. The enterprises may decide not to reduce supply chain risk for production inputs 2 and 3, as a SCR value of 3 or lower may be considered low risk. The supply chain risks may be reduced as described previously. The examples and tables show that the supply chain risk score, method and device are useful for managing supply chain risk of the enterprise.

What is claimed is:

1. A method of managing supply chain risk, the method comprising determining with a computer a degree of supply chain risk to an enterprise as a function of an effect of a disruption of delivery of a production input to the enterprise on a financial performance metric of the enterprise, wherein the determining step comprises factoring an economic impact score (EI) with a supply risk score (SR) to give a supply chain risk score (SCR) that is reflective of the degree of supply chain risk; and wherein the production input is a material or component taken in or operated on by a manufacturing process performed by the enterprise, wherein each of EI and SR independently is normalized to a scale of from >0 to 10 and SCR=EI*SR/10, wherein EI comprises normalized annual gross margin in currency (GMc) of the product(s) produced by the enterprise using the production input, wherein the normalized GMc is expressed on a logarithmic scale ($\log_{10}$) of from >0 to 10, wherein the economic impact score is >0 where the annual GMc of the enterprise related to the production input is >0% of total GMc of the enterprise and the economic impact score is 10 where the annual GMc of the enterprise related to the production input is 100% of total GMc of the enterprise; and wherein SR is at least one of an external market factor, internal market factor, supplier factor, or any combination of at least two thereof and SR is normalized to a relative scale of 1 to 10 with 1 being least likelihood of the disruption occurring and 10 being greatest likelihood of the disruption occurring;

comparing, ranking, or comparing and ranking supply chain risks of at least two different production inputs; and taking an ameliorating action so as to reduce the degree of supply chain risk.

2. The method as in claim 1, wherein the production input is a raw material or partially finished material for a chemical process performed by the enterprise.

3. A method of managing supply chain risk, the method comprising determining with a computer a degree of supply chain risk to an enterprise as a function of an effect of a disruption of delivery of a production input to the enterprise on a financial performance metric of the enterprise, wherein the determining step comprises factoring an economic impact score (EI) with a supply risk score (SR) to give a supply chain risk score (SCR) that is reflective of the degree of supply chain risk;

and wherein the production input is a material or component taken in or operated on by a manufacturing process performed by the enterprise, wherein EI=$\log_{10}$[(product(s) gross margin $C^R$)/(enterprise gross margin $C^R$)*(product(s) gross margin %, scale 0-1)*30,000*10]/$\log_{10}$[(enterprise gross margin %)*30000]; wherein product(s) gross margin $C^R$=(product(s) sales $C^R$)*(product(s) gross margin %, scale 0-1), where product(s) sales $C^R$ is total dollar sales from all product(s) manufactured from the production input and sold by the enterprise and product(s) gross margin % is the average gross margin percentage of all such manufactured and sold product(s); wherein "enterprise" and "average" refer to values for the whole enterprise (or, if desired, a relevant division thereof); and wherein $C^R$ indicates a currency denominated value; and SR is the highest score from SR(a) or SR(b), wherein SR(a) is Threat-Supply Regulation Score; and SR(b) is the sum of all of the following factors (i) to (ix): (i) number of qualified suppliers score Q, where Q=1.5 if one qualified supplier, Q=0.5 if two qualified suppliers, and Q=0 if three or more qualified suppliers; (ii) (qualification complexity score)*0.1; (iii) (logistics complexity score)*0.1; (iv) (quality complexity score)*0.1; (v) (value of production input score)*0.2; (vi) (value-enterprise score)*0.1; (vii) (historical performance score)*0.4; (viii) (threats to supplier score)*0.6; plus (ix) −4;

comparing, ranking, or comparing and ranking supply chain risks of at least two different production inputs; and taking an ameliorating action so as to reduce the degree of supply chain risk.

4. The method as in claim 1, wherein the ameliorating action comprises prioritizing and strategically implementing a program for reducing or mitigating supply disruption risks comprising diversifying source(s) of the production input, qualifying an additional supplier thereof, replacing a current supplier with a more reliable supplier of the production input, derisking the current supplier of the production input by providing it with financial or another form of assistance or by purchasing a higher volume of the production input therefrom, or providing assurance of the higher volume, or improving or securing logistics of the delivery of the production input.

5. A computer system device comprising a processor, a memory subsystem in communication with the processer, and computer executable instructions storable in the memory subsystem and executable by the processor to determine a degree of supply chain risk to an enterprise as a function of an effect of a disruption of delivery of the production input to the enterprise on a financial performance metric of the enterprise, the computer executable instructions comprising instructions for determining a degree of supply chain risk to an enterprise as a function of an effect of a disruption of delivery of a production input to the enterprise on a financial performance metric of the enterprise, wherein the determining step comprises factoring an economic impact score (EI) with a supply risk score (SR) to give a supply chain risk score (SCR) that is reflective of the degree of supply chain risk; and wherein the production input is a material or component taken in or operated on by a manufacturing process performed by the enterprise, wherein each of EI and SR independently is normalized to a scale of from >0 to 10 and SCR=EI*SR/10, wherein EI comprises normalized annual gross margin in currency (GMc) of the product(s) produced by the enterprise using the production input, wherein the normalized GMc is expressed on a logarithmic scale ($\log_{10}$) of from >0 to 10, wherein the economic impact score is >0 where the annual GMc of the enterprise related to the production input is >0% of total GMc of the enterprise and the economic impact score is 10 where the annual GMc of the enterprise related to the production input is 100% of total GMc of the enterprise; and wherein SR is at least one of an external market factor, internal market factor, supplier factor, or any combination of at least two thereof and SR is normalized to a relative scale of 1 to 10 with 1 being least likelihood of the disruption occurring and 10 being greatest likelihood of the disruption occurring;

comparing, ranking, or comparing and ranking supply chain risks of at least two different production inputs; and taking an ameliorating action so as to reduce the degree of supply chain risk.

\* \* \* \* \*